Dec. 18, 1962   D. A. GRENCI   3,068,935
WEB SLITTER AND EDGE SEALING APPARATUS
Filed Sept. 26, 1960   5 Sheets-Sheet 2

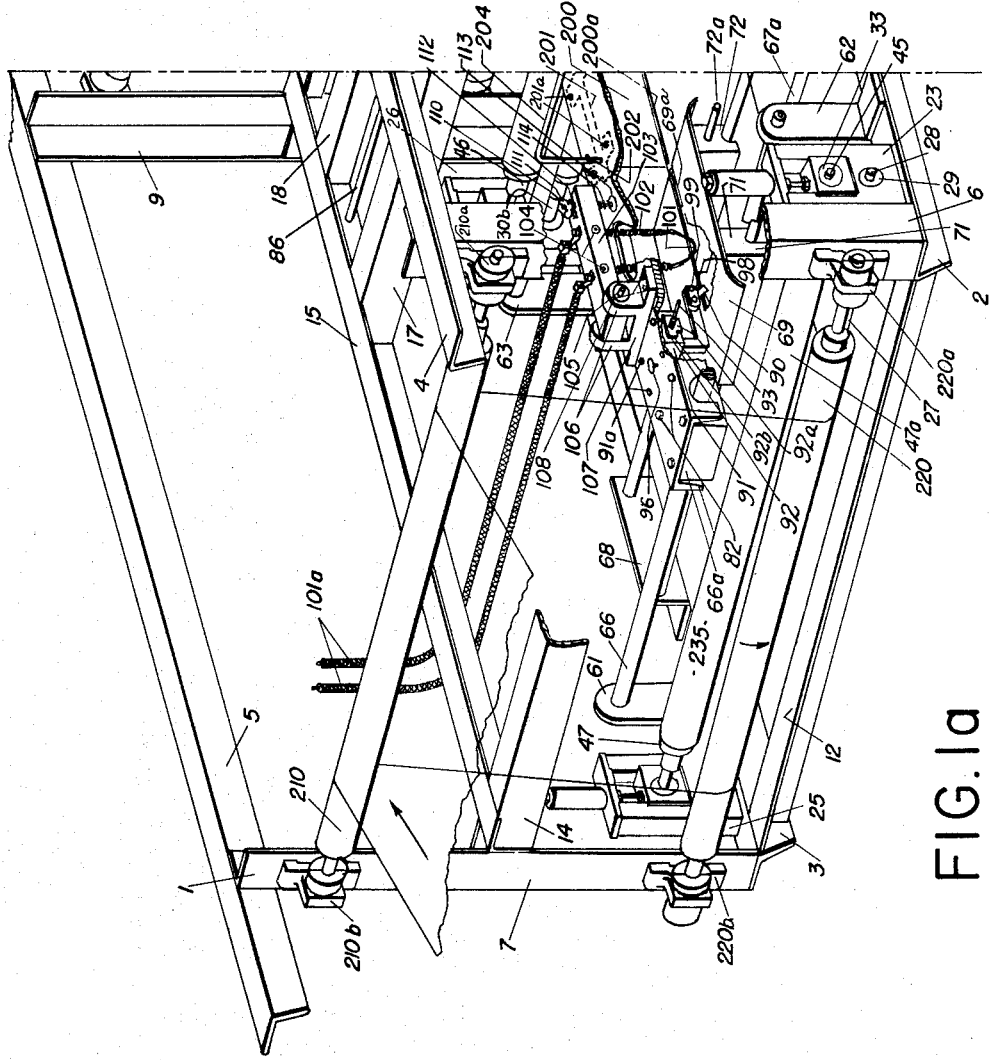

DOMINIC A. GRENCI
INVENTOR.

BY E. J. Berry

DOMINIC A. GRENCI
*INVENTOR.*

Dec. 18, 1962 D. A. GRENCI 3,068,935
WEB SLITTER AND EDGE SEALING APPARATUS
Filed Sept. 26, 1960 5 Sheets-Sheet 5

DOMINIC A. GRENCI
*INVENTOR.*
BY E. J. Berry

United States Patent Office 3,068,935
Patented Dec. 18, 1962

3,068,935
WEB SLITTER AND EDGE SEALING APPARATUS
Dominic A. Grenci, Canandaigua, N.Y., assignor to National Distillers and Chemical Corporation, New York, N.Y., a corporation of Virginia
Filed Sept. 26, 1960, Ser. No. 58,257
5 Claims. (Cl. 156—498)

The present invention relates to an improved method and apparatus for slitting and sealing continuous lengths of superimposed thermoplastic films. More particularly, the invention relates to a method and apparatus for forming continuous lengths of tubing from superposed thermoplastic films, wherein the finished tubing lengths have a lateral dimension less than that of the original film stock, and wherein the finished tubing is heat sealed along at least one longitudinal edge. The invention especially relates to a method and apparatus for forming such continuous lengths of tubing from original film stock which is a flattened tubular film obtained by extrusion of a thermoplastic material through a circular die structure.

The formation of continuous lengths of plastic tubing by slitting wider webs of superposed film material, and sealing the adjoining longitudinal edges of the superposed strips so formed, heretofore has not been generally practiced with economic success. This is been for the reason that, in a continuous operation, with the film passing through the slitting and sealing apparatus at rates of from about 90 to about 120 feet per minute, extreme difficulty usually is experienced in obtaining effective and continuous edge seals which are free of breaks and/or weak areas. Difficulty has also been experienced in maintaining a continuous operation by the use of apparatus according to the prior art. Such problems have arisen by reason of the difficulties experienced in maintaining uniform tension on the original film webs and on the slit webs before and after sealing, such as to prevent bunching in the area of the slitter knives, and stretching of the slit strips before and after sealing. Such difficulties tend to produce puckering and non-uniform edge seals, as well as clogging at the knife edges.

It is an object of the present invention to provide an apparatus for longitudinally slitting substantially continuous, superposed film webs of a thermoplastic material into a plurality of pairs of superposed adjacent strips, and thereafter to seal the layered cut edge portions of paired strips to form a continuous, flattened, tubular web unit adapted for subsequent sealing and division laterally into individual elements suitable for use as container packages. Another object of the present invention is to provide such an apparatus and method of operation wherein the slitting and sealing steps are accomplished at feed rates up to about 200 feet per minute, or even higher, while maintaining smooth, uniformly effective, longitudinal edge seals in the finished tubular product. A further object of the invention is to provide an apparatus and method of operation wherein the edge seals, as formed, are positively set by cooling to a temperature substantially below the "melt" temperature of the thermoplastic material employed. A particular object of the invention is to provide a method and apparatus adapted for high speed slitting and sealing of layered thermoplastic webs, wherein the individual layers have a gauge in the range of from about 0.5 to about 2.0 mils.

The invention and its objects may be more fully understood from the following specifications when they are read with reference to the accompanying drawings, of which:

FIGURES 1a and 1b are two parts of an isometric view, with parts broken away, of the apparatus contemplated;

Figure 1B:
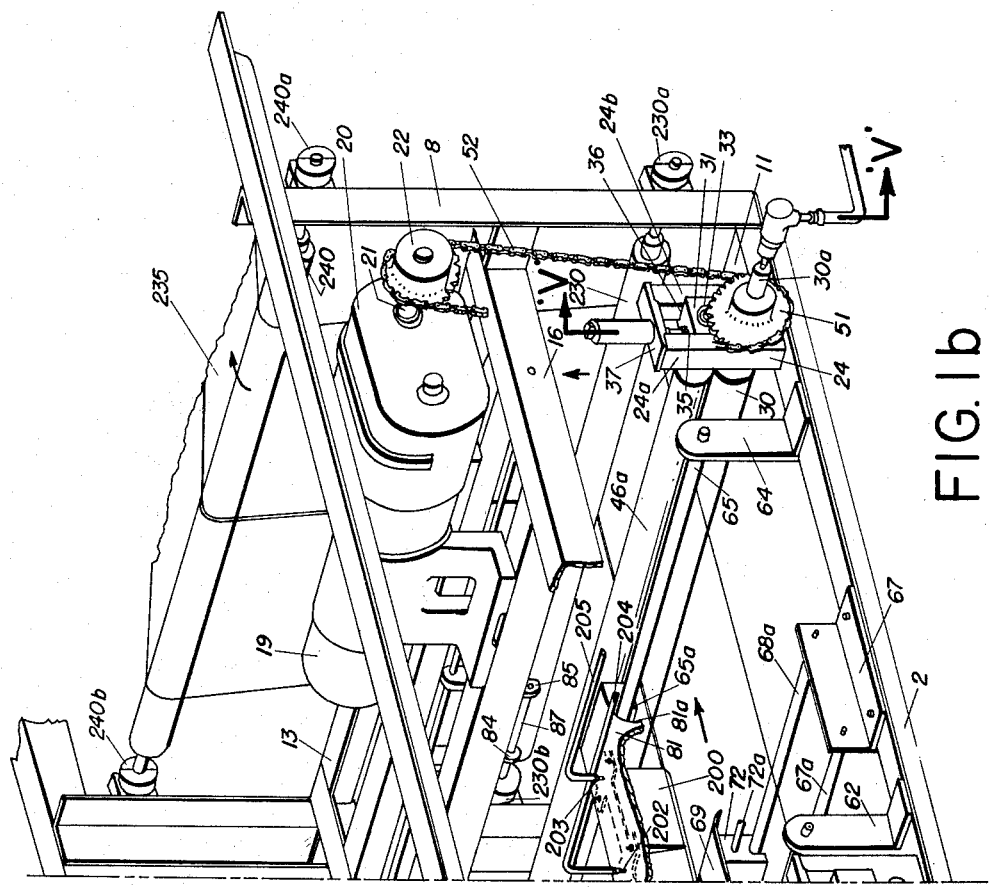

In the several figures, like parts are similarly designated by number. More specifically, the numeral 1 designates a frame support structure of generally four-sided, open box frame construction. This structure includes parallel upper and lower rail members arranged in pairs and respectively designated by the numerals 2 and 4, and 3 and 5. The rail members are connected in spaced pairs by means of paired connecting support legs, of which leg supports 6 and 8 connect rails 2 and 4, and leg supports 7 and 9 connect rails 3 and 5. As shown, the upper rails 4 and 5 are slightly longer than the lower rails 2 and 3, whereby the upper rails extend beyond the vertical leg supports, at least on one end, and at least in the direction of travel of a web passed through the apparatus, this direction being indicated by arrows.

The side frame portions produced by joinder of the side rails and vertical supports additionally are joined in laterally spaced relation by means of lower and intermediate end rail members, disposed between the side frame portions, and designated in pairs by the numerals 11 and 13, and 12 and 14 respectively. In addition, the side frame portions of the structure include intermediate side rail members 15 and 16 respectively secured at their ends to the vertical support legs 7 and 9 and 6 and 8, and to the intermediate end rail members 13 and 14.

In the structure as illustrated, and thus far described, the frame specifically provides two parallel, vertically spaced, horizontal platform-support levels. An upper level is peripherally defined by the intermediate side and end rail members 15 and 16, and 13 and 14 respectively. A lower level is peripherally defined by the lower side and end rail members 2 and 3, and 12 and 11 respectively.

On the upper level two cross frame support members 17 and 18, secured at their outer ends to each of the intermediate side rail members 15 and 16, provide a mount for a motor 19 and gear drive case 20. A driven shaft 21 extends outwardly from the drive case 20, beyond the intermediate side rail member 16, with a toothed sprocket wheel 22 mounted therebeyond on the shaft 21.

On the lower level, adjacent each end, a roller support member is mounted on each side rail member. The members 23 and 25, and 24 and 26 are respectively mounted in opposed pairs. The paired members 23 and 25 provide support for a solid metal roller 21 extended transversely of the frame between side rail members 2 and 3. A roller shaft 28 is held in each support 23 and 25 for rotation in a suitable bearing, such as designated at 29. The paired members 24 and 26 provide support for a hollow metal roller 30 by means of hollow stub shafts 30a and 30b at the roller ends.

Figure 5:
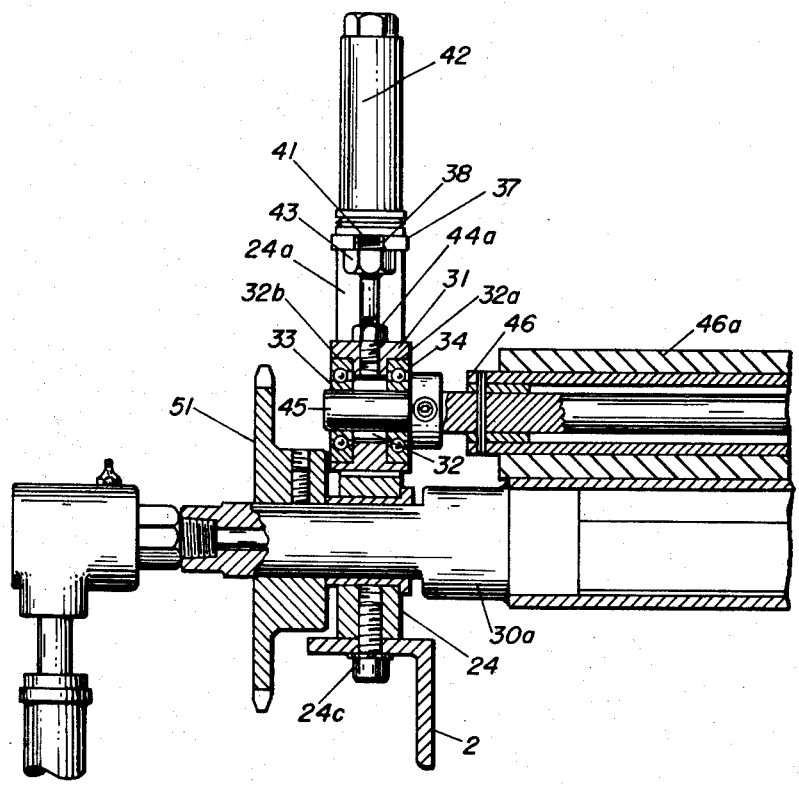
FIGURE 5 is a generally cross sectional view taken along the line V—V of FIGURE 1b.

As shown, each of the supports 23 to 26 inclusive comprises a base portion adapted to be secured to the frame side rails, as by means of stud bolts as indicated by the numeral 24c in FIGURE 5. Each support also provides a pair of upstanding retainer arms, defining a slotted portion between them, such as representatively indicated by the numerals 24a and 24b in the drawings. Each of the slotted portions is adapted to receive between them a bearing block such as the one indicated in the drawings by the numeral 31. Each block provides front and back surface portions connected by side, top and bottom surface portions. The front and back surface portions have a width greater than the distance between the legs 24a and 24b, and the side, top, and bottom surface portions of the block are wider than the depth of the facing surfaces of the legs.

As more particularly shown by FIGURE 5, the block 31 is drilled from front to back to form a bore 32, having enlarged portions 32a and 32b providing an oppositely opening pair of annular recesses adapted to receive annular bearing-raceways 33 and 34. In addition, the top of the block is drilled to form a bore 32c radially related to the center bore 32, the bore 32c being threaded. Further, each side surface portion of the block is routed to define a pair of longitudinally extending recesses of equal depth. These recesses, designated by the numerals 35 and 36 in FIGURE 1b are adapted to receive the legs 24a and 24b for relatively slidable motion of the block therebetween.

Mounted on the upper ends of the support legs, such as 24a and 24b, to bridge the space between them is a mounting plate 37. This plate defines a central opening 38, threaded to engage an externally threaded nipple part 41 of an hydraulic cylinder 42. A lock nut 43 engages the end of the nipple 41, extended through the plate 37, whereby to mount the cylinder 42 in fixed relation to the plate. The cylinder 42 includes a piston shaft 44 of which the lower end is adapted for threaded engagement in the block bore 32c, with a lock nut 44a on the shaft 44 to maintain this engagement.

The bearings 33 and 34, in each block are adapted to receive the respective ends of shafts such as indicated by the numeral 45. Each of these shafts provides a mount for rollers such as that indicated in FIGURES 1a, 1b, and 5, by the numerals 46 and 47 respectively, having a coating 46a of rubber or a similar resilient material. In this assembly, the hydraulic cylinders 42 are provided for adjustment, whereby the pressure exerted on the blocks 31, and thereby on the rollers 46 and 47, may be regulated as required to maintain a suitable tension in a layered web as passed between the ends of the frame.

The hollow stub shafts 30a and 30b are provided for connection in a system for circulating water, preferably chilled, through the roller 30. Also, the stub shaft 30a is adapted to mount a sprocket wheel 51, aligned with the sprocket wheel 22, and is driven therefrom by means of a sprocket chain 52.

Between the support block and roller assemblies, disposed at each end of the frame 1, is disposed a means for slitting and edge sealing a layered web passed through the frame from end to end. The slitting and sealing assembly includes first, two pair of upstanding support brackets, including the brackets 61 and 62, and 63 and 64. In each pair, one is secured to the side rail 2, and the other to the side rail 3. The paired brackets are aligned one with another on an axis parallel to the end frame members 11, 12, 13 and 14. Each pair of brackets is interconnected by means of a rod-like cross-frame support member extended along the axis of alignment in each pair. These rod-like members are designated in the drawings by the numerals 65 and 66.

Intermediate the respective pairs of bracket supports, 61, 62, 63 and 64, and longitudinally of the frame, another pair of bracket supports 67 and 68 are mounted respectively on the side rails 2 and 3, substantially as shown. These brackets are also aligned laterally of the frame 1, and provide support for a transverse forming plate 69.

Figure 2:
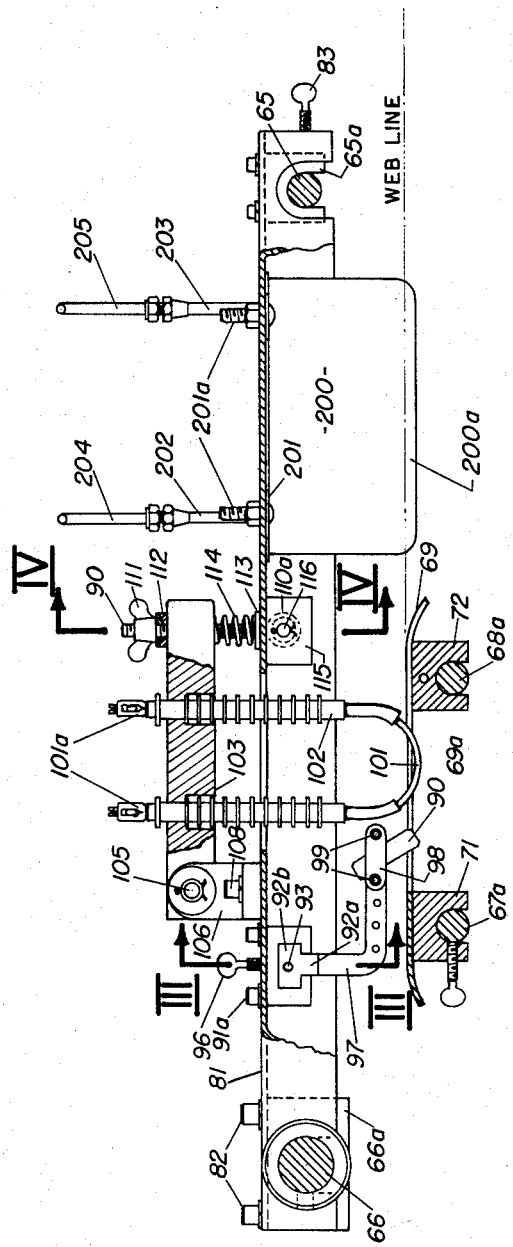
FIGURE 2 is a view in side elevation of the slitting and sealign assembly shown by FIGURES 1a and 1b.

The plate 69, as shown in FIGURE 1a, is downwardly curved along its leading and trailing edges, the flat upper surface of the plate being disposed in a plane extending tangentially between the rollers 27 and 47, and the rollers 30 and 46. Also, depending upon the number of slits and seals to be made in a layered web passed thereover, the plate defines one or more slots, such as the slot 69a, opening through the plate intermediate the edges thereof, and disposed in edgewise, spaced, parallel relation to the respective sides of the plate, and to each other, if more than one slot is employed. Preferably, the plate 69 is mounted on the paired brackets through the medium of connecting rods 67a and 68a, supported on the brackets 67 and 68. The connecting rods extend laterally of the frame 1 in parallel relation to each other and the frame and rails 11 and 12, and a comparable pair of mounting blocks 71 and 72 secured to the under surface of the plate. The blocks are suitably recessed longitudinally to fit over the connecting rods 67a and 68a. Thumb screws, or other means, may be provided for securing the blocks to the rods, as shown in FIGURE 2. In addition, it is desirable that the block 72, at the trailing edge of the plate be drilled longitudinally to provide a water bore or passageway for circulation therethrough of a cooling medium such as water. The numeral 72a designates a conduit connection for introduction of a cooling medium. Means, not shown, may be provided for making a connection to a source of the cooling medium, and for discharge thereof.

As shown, the brackets 61 to 64 inclusive are extended to support the rods 65 and 66 at a level above that of the plate 69. Supported on these rods, is at least one channel support, such as designated by the numeral 81 in the drawings. For the purpose of this description, the end of the channel support engaged on the rod 66 is designated as the leading end, while that engaged on the rod 65 is designated as the trailing end.

As shown, the channel support 81 is disposed in an inverted position, the bottom web, which connects the channel side webs, being exposed upwardly with the side webs extended downwardly. Also, as shown, each side web has a U-shaped cutout portion at each end, such as the one indicated by the numeral 81a, with each such portion in one side web matched and aligned with a similar portion in the opposite side web. These matched cutout portions are spaced longitudinally of the channel support 81 at a distance, center to center, which corresponds to the center to center distance between the rods 65 and 66, the cutout portions being adapted to receive the rods so that the channel member may be supported thereon.

In order to secure the channel support member 81 in relation to the rods 65 and 66, at the leading end of the member 81 a channel block 66a, adapted to fit between the channel side webs, and having a transverse U-shaped recess fitted to the rod 66 is applied against the under surface of the rod, and secured to the inner surface of the bottom web as by means of stud bolts such as indicated by the numeral 82. At the trailing end of the member 81, a channel block 65a, having a transverse recess, similar to that of the block 66a, is fitted between the side webs of the channel, with the recess matched to and opening with the side web cutout portions in the trailing end of the channel member. A thumbscrew, designated by the numeral 83 in FIGURE 2, is threaded through a drilled bore in the block to engage the rod 65 when received by the block recess, to fix the relationship of the channel member to the rods.

A third support for the channel member 81, adapted to permit the trailing end thereof to be supported in raised position above the layered plastic material passed through the frame 1, is provided by means of an opposed pair of hanger arms 84 and 85 freely supported as by means of a rod 86 on the respective intermediate side rail members 16 and 15 to depend therefrom. The opposed hanger arms are cross-connected by means of a rod 87, the rod 87 being adapted for engagement in the cutout portions and channel block recess at the trailing end of the channel member 81.

The bottom web of the channel member 81 provides a mounting base for a series of related operating elements disposed in a line adapted for parallel relationship to a film web passed through the frame 1, and to the plate member 69. In the direction of film web travel through the frame 1, as indicated by arrows in FIGURES 1a and 1b, the first element in the series of operating elements is a knife blade 90, and a support assembly therefor. The knife blade and the support assembly is shown in FIGURE 1a, and in further detail by FIGURE 3.

As illustrated, the support assembly includes a support block 91, secured, as by means of cap screws 91a, to the bottom web of the channel 81, between the side web portions thereof, in parallel, laterally spaced relation thereto. Preferably the lateral dimension of the block 91 is not greater than about one half the distance between the channel side web portions, and it is disposed with its longitudinal axis aligned with the center line of the channel bottom web. The block, as shown defines a T-shaped passage 91b opening through the block from side to side, and in right angular relation to the center line of the channel bottom web. Alternately, the T-shaped passage 91b may be formed by means of a generally inverted U-shaped recess defined in the block 91, and a pair of plate members mounted at the outer ends of the legs of the U, so as to partially close the recess. The passage 91b provides a slideway, adapted to receive a T-shaped slide block 92 wherein the vertical portion 92a depends from the cross head portion 92b so as to extend outwardly and downwardly beyond the support block 91b.

Figure 3:
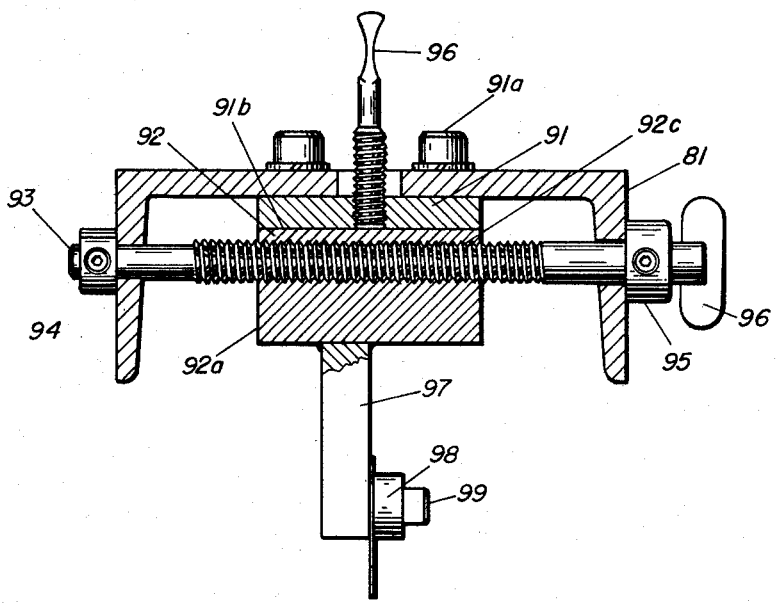
FIGURE 3 is a view taken along the line III—III of FIGURE 2, with parts shown in cross section.

As more particularly shown in FIGURE 3, means whereby to move the slide block 92 in the passage 91b is provided by a threaded passage 92c defined in the cross-head portion 92b to extend the length thereof, and open at each end toward an adjacent side web portion of the channel 81. Passageways are defined in the respective side web portions also. These are aligned with each other and with the threaded passage 92c, and are adapted to receive the respective ends of a shaft 93. The shaft has a threaded portion 93a, intermediate the ends, which is adapted for threaded engagement in the slide block passage 92a. Collars 94 and 95 retain the shaft in a fixed position between the channel side web portions, while means such as a thumb screw 95 is provided for rotation of the shaft. In this assembly, when the shaft is rotated, the interacting threads on the shaft and in the passage 92c, cause the slide block 92 to be moved in the passage 91b. Movement of the slide block is toward or away from the respective shaft ends, depending upon the direction in which the thumb-screw may be rotated. Another thumbscrew 96, adapted for threaded engagement in a bore opening through the block 91, and the bottom web of channel 81, provides means for setting any selected position of the slide block 92.

The knife blade support assembly is completed by a blade holder arm 97. This arm is an L-shaped member wherein the vertical leg is secured to the lower end of the portion 92a of the T-shaped slide block 92. This leg as thus secured, and with the channel member 81 positioned on the rods 65 and 66, is adapted to support the horizontal leg of the member 97 in closely spaced parallel relation to the upper surface of the plate 69. In this assembly, the knife blade is adapted to be retained between the horizontal leg of L-shaped arm 97 and a clamping plate and bolts 98, and 99 respectively with the cutting edge of the blade disposed at an obtuse angle to the holder leg and an acute angle to the plane of the plate 69, and so as to extend through a plate slotted portion, terminating at a level below the plate.

Next in the linear series of operating elements is a sealing support assembly, adapted to support a film edge-sealing element, including a generally U-shaped electrical resistance wire or rod 101 and a pair of dielectric holders 102. The support assembly includes a dielectric hinge arm 103 bored to receive the holders 102, which are insertable through the respective bores and held therein as by set screws 104. The channel member 81, is slotted, to permit passage of the rod 101 and holders 102 as a unit, and to permit a degree of movement thereof on an axis above and at right angles to the center line of the member 81. The ends of the rods 101 extend beyond the secured ends of the holders 102 for connection of electrical leads 101a.

At one end, the hinge arm is drilled laterally to receive a hinge pin 105, insertable through the arm, and also through corresponding aligned passageways drilled in each of two laterally spaced upstanding ears 106 integral with a hinge block 107. The block is mounted on the upper surface of the bottom web in any suitable manner, for example, as by welding, or by cap screws 108 shown. The arm 103, as shown, is hinged so as to extend from the hinge axis in the direction of travel of the film web through the frame.

Figure 4:
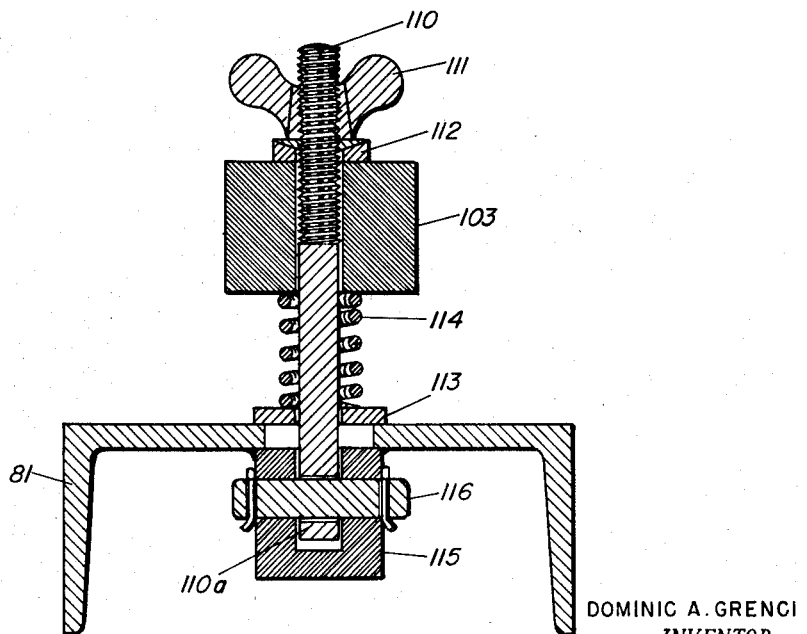
FIGURE 4 is a view taken along the line IV—IV of FIGURE 2, with parts shown in cross section.

As shown more particularly by FIGURE 4, the outer end of the arm 103 is drilled from top to bottom surfaces to form an open bore adapted to freely receive an eye bolt 110, with the bolt shaft threaded for engagement in a wing nut 111. The wing nut 111 provides a spherically convex surface adapted to be received by the spherically concave surface of an annular washer 112 disposed between the upper surface of the hinge bar and the wing nut. A flat washer 113 on the bolt shaft retains an expansion spring element 114 between it and the under surface of the bar.

A means for engaging the eye 110a of the bolt 110, in relatively fixed pivotal relation to the channel member 81, is provided by means of a recessed pivot block 115. The block 115 is routed longitudinally to provide a recess having spaced wall portions adapted to be secured at their unconnected ends to the under surface of the bottom web of channel 81, along opposite edges of a slotted portion defined in the channel bottom web to extend longitudinally thereof. This slotted portion is adapted to pass the eye 110a of bolt 110 into the recess of the block 115, wherein it is retained by means of a pivot pin 116 inserted through and held in aligned passageways defined in the recess walls of block 115. The unconnected ends of the block recess walls preferably are secured to the channel bottom web as by welding.

The third of the linear series of operating elements provides a means for cooling and setting the seal formed by the seal unit including the edge sealing element 101. As shown in FIGURES 1a and 2 this third element includes a hollow blade portion 200, of generally wedge-shaped, inverted triangular cross section. The blade portion base end is secured, as by welding, to a generally H-shaped support 201, shown by dotted lines in FIGURES 1a and 1b, adapted to be secured to the undersurface of the channel member 81 by bolts 201a, whereby to suspend the blade portion 200 so as to align its longitudinal axis with that of the channel 81, and so that apex edge 200a of the blade portion may intercept a plane common to the upper surface of the forming plate 69. The base edge of the blade is also provided with upstanding inlet and outlet conduits 202 and 203 communicating with the hollow interior of the blade portion, and adapted to extend through matching passageways defined in the bottom web of the channel member 81. Provision is made for circulating a fluid medium through the conduits and the blade by means such as flexible conduits 204 and 205 connected to a suitable source not shown.

To provide for suitable ingress and egress of a layered web of film to be slit and sealed in the manner contemplated, and to aid in passing such web along a travel path extending through the frame 1 in a plane common to the upper surface of the forming plate 69, a series of smooth idler rollers are mounted on the frame substantially as shown. In the drawings, these rollers are indicated by the numerals 210, 220, 230, and 240. Each such roller is mounted by means of paired pillow block bearing members such as designated in the drawings by "a" and "b" numerals corresponding to the numerals applied to the respective rollers. Thus, the paired blocks which support the roller 210 are designated by the numerals 210a and 210b. The exact location of the rollers at each end of the frame is not critical, except as required to insure proper introduction of the film web to the action of the series of related operating elements, and to insure a smooth and uniform withdrawal of the film web following the slitting and sealing operation.

Not shown in the drawings, is a feed roll from which a layered film web may be withdrawn, and a receiving roll on which the processed web material may be rewound. Such rolls are conventional, and well known in the art. The web itself is designated by the numeral 235. Also not shown in the drawings, the receiving roll may be provided with conventional drive means synchronized to the film web processing rate of travel, while the feed roll may be provided with means adapted to maintain a suitable rate of film web withdrawal from the roll. Alternately, the layered film web may be supplied directly from a film web production source.

Operation of the apparatus, as shown by the drawings and described above, is initiated with the channel support member 81 in a raised position, suspended from the hanger support rod 87. In this position, the knife blade 90, sealing wire 101, and cooling blade 200 are all disposed in upwardly spaced relation to the plane of forming plate 69. With these operating elements so disposed, a layered film web is drawn from the supply source, passed over roller 210, and downwardly to pass under the roller 220. Thence the film web is passed between the rollers 27 and 47. At this stage, preferably, the roller 47 is raised by suitable activation of the hydraulic means engaged at the roller ends.

With the roller 46 at the other end of the frame 1 similarly elevated, the film web is led over the forming plate 69 and between the rollers 46 and 30. From there, the film web is passed under, and partly around the roller 230, and then over the roller 240, to be engaged on the winding roll. With the film web thus threaded through the apparatus, the hydraulic means connected to the rollers 46 and 47 are actuated to engage the web between these rollers and their respective cooperating roller elements 30 and 27.

At this time, the respective drive means for the roller 30, and for wind-up roll are actuated. Simultaneously, the pressures exerted on the rollers 46 and 47 are adjusted to regulate the tension in the web, whereby to attain tension therein between about 0.25 and 0.5 pound per square inch. Tension of the web is extremely critical. Excessive tension will tend to spread the web parts formed at the cutting knife, causing the webs to lose contact with the resistance heater wire, and thereby resulting in web parts wherein the cut edges are not sealed. Excessive tension also may cause a nonuniform spreading of the slit webs which may cause only one of the web layers to contact the resistance heater wire. Insufficient tension will cause the edges of the split web layers to curl up or under as they pass the resistance heater wire resulting in a ragged heal of poor quality. Incorrect tension will also cause intermittent sealing of the slit edges of the web layers.

With the proper web tension attained, the channel support 81 is removed from the hanger rod 86 and lowered into its normal operating position in engagement with the rod 65. As the support is lowered, the knife 90 penetrates the web. As the web is then drawn against the knife edge it is slit continuously.

In the meantime the resistance heater wire 101 has been energized to attain a temperature therein in the range of from about 1300° F. to about 1500° F. The electrical energy input to the resistance heater wire must be such that the wire remains at all times glowing red regardless of web speed or film thickness. Keeping the wire glowing red will tend to burn off immediately any incident accumulation of the plastic material. If the wire is cooled by the passing web, a poor ragged seal results which has very low strength. Also, the plastic material of the web will tend to adhere to and accumulate on the wire. Such accumulation may deposit on the web, causing the slit edges to be ragged, and also cause seals to vary in strength. Operating the resistance heater wire at the proper temperature will result in a seal that has strength equal to or greater than the film. A proper seal will closely resemble a crease caused by a fold in the web.

Likewise circulation of a chilled heat exchange fluid has been started through the blade 200 whereby to attain a blade surface temperature in the range of from about 60° F. to about 70° F. As the channel support is lowered then, first the wire 101, and then the blade 200 enters the slit formed by the knife 90, the hot wire fusing the slit edges on either side, and the chilled blade setting the fused portions. By adjustment of the thumb screw 111, the wire 101 may be raised or lowered as required to obtain any desired degree of contact between the wire and the slit edges of the web.

What is claimed is:

1. An apparatus for continuously forming a series of parallel, contiguous, edge sealed, layered webs of a thermoplastic material, while moving said webs along a planar travel path, comprising a forming plate, said plate defining at least one longitudinally extended slot therein; means for simultaneously moving at least two superposed film webs of said plastic material uniformly over said plate in the direction of said defined slot, and without substantial relative movement of said webs; a slitter knife assembly, heat sealing means, and seal setting means disposed as a relatively spaced successive linear series along the longitudinal axis of said slot; a support for said series of means disposed so as selectively to position said slitter knife, heat sealing means, and seal setting means in intercepting relation to the travel plane of said film webs, and with said slitter knife and sealing means extended through said slot and means for maintaining a predetermined degree of tension in said superposed film webs.

2. An apparatus according to claim 1, wherein said support for said series of means comprises an inverted channel member having a longitudinal axis disposed in a plane common to a longitudinal axis of said web travel path and perpendicular thereto, said member being pivotally suspended at one end for limited arcuate movement upwardly from a first position wherein its longitudinal axis is parallel to the plane of said web travel path to a second position, wherein said member axis is angularly related to said travel path, and suspension means substantially at the limits of arcuate movement of said channel member adapted to engage the other end of said member.

3. An apparatus according to claim 1, wherein said heat sealing means comprises a hinge block, including a pair of upstanding ear portions carried on the upper surface of said suspension support; a hinge arm pivotally mounted at one end between said ear portions, to extend in the direction of travel of said webs; means at the other end of said hinge arm for resiliently attaching and supporting said arm in spaced reference to said suspension support upper surface; a slot defined in said suspension support intermediate the ends of said arm; a substantially U-shaped electric resistance heating element suspended from said arm to extend downwardly therefrom through said slot for a distance at least equal to that required to permit said U-shaped heating element to intercept the plane of said forming plate; and means adjusting extension of said heating element with relation to said plane.

4. An apparatus according to claim 1, wherein said means for maintaining a predetermined degree of tension in said superposed film webs comprises two pairs of rollers wherein said pairs are disposed in right angular relation to said planar travel path, at opposite ends of said travel path, and in spaced relation to each other and to said forming plate on opposite ends thereof, in each said pair of rollers, their axes being disposed in a common plane perpendicular to the plane of said travel path; a first, hard surfaced, roller in each pair disposed in fixed relation to said travel path plane and in substantially tangential relation thereto; a second, resiliently surfaced, roller in each pair; means for forcing each second roller into pressured engagement with a corresponding first roller in the respective pairs; and means for rotating said hard surfaced roller in one said pair of rollers disposed at the terminal end of said travel path.

5. An apparatus of the character described, comprising a three dimensional support frame, including opposed side and end frame members therein, said side frame members defining the lateral limits of a travel path extending substantially from end to end of said frame, including initial and terminal ends thereof; a first pair of rollers having roller shafts supported at each end in bearings carried on said side frame members, said rollers extending transversely of said frame in right angular relation to said travel path at the initial end thereof; a second pair of such rollers, similarly disposed at the terminal end of said path; each said pair including a hard surface roller disposed in fixed relation to said frame and in substantially tangential relation to said travel path, and a resilient surface roller supported with its axis in a vertical plane common to the axis of said hard surface axis and perpendicular to said travel path, and for selectively controlled pressure engagement with said hard surface roller; means for moving said resilient surface roller reciprocally with reference to said hard surface roller and to engage said roller under pressure; drive means for rotating said hard surface roller at the terminal end of said travel path; and means for circulating a heat exchange fluid through said latter roller; a forming plate intermediate said initial and terminal end of said travel path, said plate defining a slotted portion extending in a direction longitudinally of said frame and said travel path, and means carried by said frame for supporting said forming plate with an upper surface substantially coincident with the level of said path and of the hardened surface roller in each pair; an inverted channel member carried by said frame intermediate the side and end frame members thereof so as to dispose its longitudinal axis in parallel, coextensive relation to said travel path; said member being pivotally mounted at the end next adjacent the initial end of said travel path and removably mounted at the opposite end; a slitter knife assembly, heat sealing assembly, and a seal setting plate means suspended from said channel member in a relatively spaced successive linear series along the axis of said forming plate slotted portion, to depend from said channel member to intercept the plane of said travel path and with said slitter knife and sealing means extended through said slot, and means for drawing a sheeted material through said travel path, over said forming plate and hard surface rollers, while inducing and maintaining a predetermined degree of tension in said material, which means includes drive means for rotation of said hard surface roller at the terminal end of said travel path.

References Cited in the file of this patent

UNITED STATES PATENTS

| | | |
|---|---|---|
| 2,680,470 | Stanton | June 8, 1954 |
| 2,707,018 | Bolton | Apr. 26, 1955 |
| 2,759,524 | Davis | Aug. 21, 1956 |
| 2,781,079 | Ruby | Feb. 12, 1957 |